S. W. Pingree,

Leaching Apparatus.

No 1,922 Reissued Mar. 28, 1865.

Witnesses:

Thos. H. Douglas

Geo. W. Reed

Inventor:

S. W. Pingree

N. PETERS, PHOTO-LITHOGRAPHER, WASHINGTON, D. C.

UNITED STATES PATENT OFFICE.

S. W. PINGREE, OF LAWRENCE, MASSACHUSETTS.

IMPROVED PROCESS FOR EXTRACTING TAN-BARK.

Specification forming part of Letters Patent No. 41,782, dated March 1, 1864; Reissue No. 1,922, dated March 28, 1865.

*To all whom it may concern:*

Be it known that I, S. W. PINGREE, of Lawrence, in the county of Essex and State of Massachusetts, have invented a new and Improved Process for Extracting Tan-Bark; and I do hereby declare that the following is a full, clear, and exact description thereof, which will enable those skilled in the art to make and use the same, reference being had to the accompanying drawings, forming part of this specification, in which—

Figure 1:
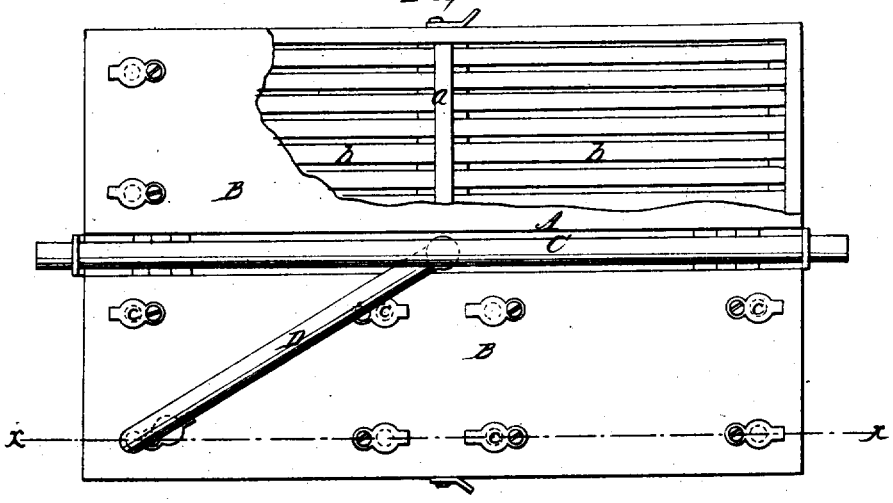
Figure 2:
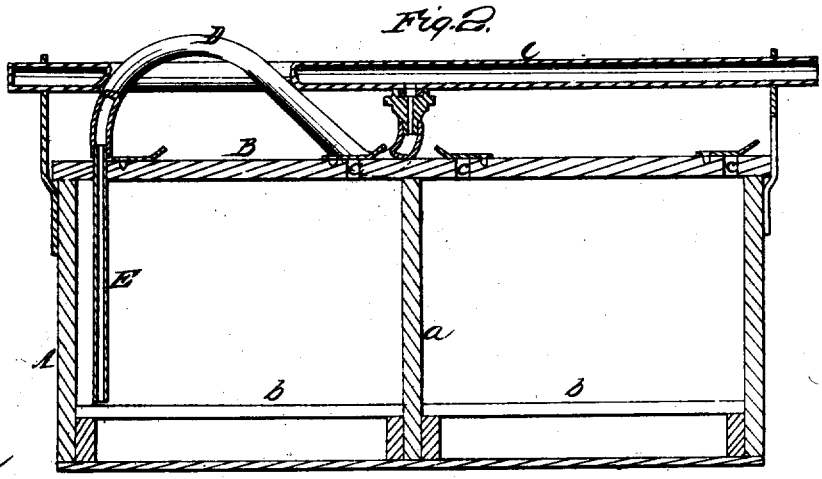

Figure 1 represents a sectional plan or top view of the apparatus which I use to carry out my invention. Fig. 2 is a longitudinal vertical section of the same.

Similar letters of reference indicate corresponding parts.

This invention is principally based on the use of steam in making extracts from tan-bark; and it consists in treating tan-bark after it has been ground, first, with weak tan liquor or water, whereby it is swelled, and after the first liquor has been drained off, with steam, which penetrates the bark and prepares it for a second percolation with cold water or weak tan-liquor, and a second treatment with steam, in such a manner that by the application of the first lotion the bark is prepared for the action of steam, and by the application of the steam the soluble parts contained in the bark are softened and brought in the best condition to give up their tannin to the second lotion of cold water or weak tan-liquor.

The apparatus in which I execute my process consists of an ordinary leach-tub, A, which may be divided by partitions *a* into four (more or less) compartments, each of which is provided with a false perforated or slotted bottom, *b*. The tan-bark, which may first be ground, is placed in the leach-tub and steeped in weak tan liquor or water for three to six hours. By the action of the liquid the bark is softened and swelled and a portion of the strength of the bark is extracted. The liquor thus obtained is drained off and the bark is exposed to the action of steam. In order to accomplish this object I cover the leach up with a tightly-fitting cover, B, and admit steam through a pipe, C, which extends over the entire length of the leach A. The cover C is perforated with a series of holes *c*, which can be closed by slides or other suitable devices, and a pipe, D, which may be of india-rubber or other flexible material, or of iron, conveys the steam through the holes *c* to the different compartments of the leach. If a flexible pipe is used it must be provided with a metallic mouth-piece, E. The mouth-piece of the steam-pipe extends down through the bark nearly to the perforated bottoms of the several compartments, and when the bark has been thoroughly heated in one compartment the mouth-piece is passed through another of the holes *c*, and so on until all the bark in the leach has been acted upon by the steam. The leach is then again filled with cold water and allowed to steep for thirty minutes, and then the bark is heated a third time, as before, until the steam reaches the top of the bark and it is again covered with weak tan-liquor. This liquor can be used to wet new-ground bark if very strong liquor is desired. Cover the bark in the leach with weak liquor or water, to remain until the bark is cold. This will take the entire strength from the bark.

By the application of steam in the manner above described I obtain from fifteen to thirty-five per cent. more strength for tanning than is obtained by the usual method of heating bark and water or running hot water on the bark. The hard parts of the bark not reached by heating in the ordinary manner are softened by my process and brought in such a condition that they give up their tannin; and, furthermore, a vast amount of heating is saved by my process. In the ordinary process the liquid is heated with the bark, but in my process the bark alone is heated by the action of steam, and the liquor is poured on cold; and after the bark has been extracted by the ordinary process, the liquor has to be left to cool for several hours before it can be used, whereas the liquor prepared according to my process is cool as soon as the process has been completed, and can be used without loss of time.

I claim as new and desire to secure by Letters Patent—

1. The within-described process of extracting tan-bark by first swelling the bark with water or weak tan-liquor and heating it with steam, and afterward steeping with cold water or weak tan-liquor substantially in the manner set forth.

2. Introducing steam into the bark contained in a leach at different points through a pipe, D, in the manner and for the purpose substantially as described.

S. W. PINGREE.

Witnesses:
M. M. LIVINGSTON,
C. L. TOPLIFF.